April 10, 1928.
P. B. TAYLOR
HYDROCARBON ENGINE
Filed Sept. 11, 1924
1,665,288
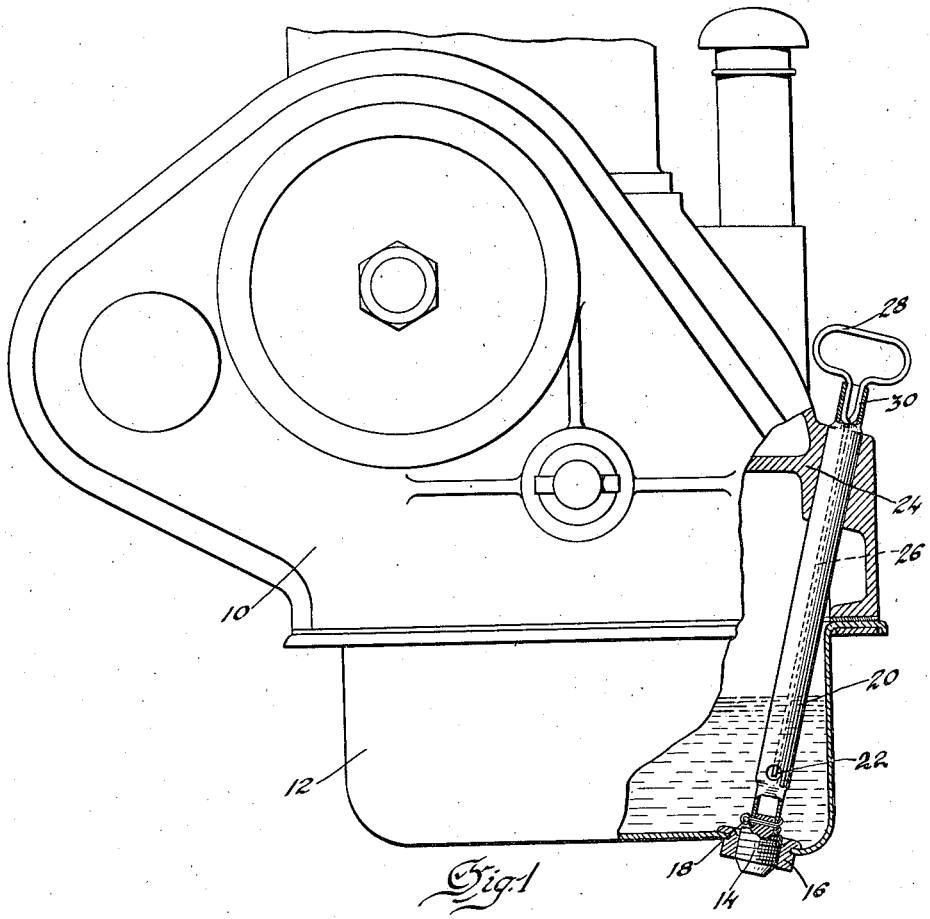
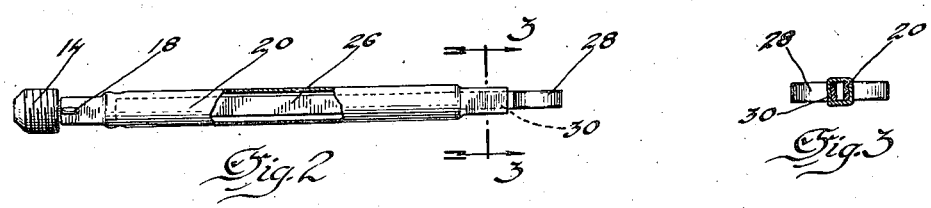
INVENTOR
Paul B. Taylor
BY
Blackwood, Spencer & Fleet
ATTORNEYS Patented Apr. 10, 1928.

1,665,288

UNITED STATES PATENT OFFICE.

PAUL B. TAYLOR, OF PONTIAC, MICHIGAN, ASSIGNOR TO GENERAL MOTORS CORPORATION, OF DETROIT, MICHIGAN, A CORPORATION OF DELAWARE.

HYDROCARBON ENGINE.

Application filed September 11, 1924. Serial No. 737,153.

This invention relates to hydrocarbon engines, and is illustrated as embodied in an automobile engine. An object of the invention is to provide means accessible from above the crankcase for draining the crankcase, by operatively connecting a valve such as the drain-plug to an oil gage. In one desirable arrangement the gage fits into a tubular sleeve connected to the drain-plug, so that the gage may be turned to unscrew the plug.

The above and other objects and features of the invention will be apparent from the following description of one illustrative embodiment shown in the accompanying drawings, in which:

Figure 1 is an end elevation of part of an automobile engine, partly broken away to show the drain-plug, the gage, and the connection between them;

Figure 2 is a side elevation, partly broken away, of the drain-plug, sleeve, and gage; and Figure 3 is a section through the sleeve and gage, on the line 3—3 of Figure 2.

The engine shown includes a crankcase 10, and an oil reservoir 12 having means for draining off the oil, shown as a drain-plug 14 threaded from the top downwardly into a threaded bushing 16 secured in an opening in the bottom of the oil reservoir. To the squared top of plug 14 is secured by a cotter pin 18 the squared bottom of a cylindrical tube 20 having an opening 22 for the oil. The upper end of the tube is rotatably supported in a cylindrical bore through a boss 24 in the upper part of the crankcase. On the outside of the crankcase, tube 20 is again squared to embrace an oil gage 26 formed of a flat strip of metal looped around at the top to form a handle 28, and having its end brought in to form a resilient neck 30 just below the handle, which yieldingly engages the squared part of the tube to hold the gage frictionally in place. Thus the gage may be withdrawn for inspection to determine the oil level, or it may be turned to rotate tube 20 to unscrew plug 14 in draining the oil reservoir.

While one illustrative embodiment of the invention has been described in detail, it is not the intention to limit its scope to that particular embodiment or otherwise than by the terms of the appended claims.

It will be obvious, also that the invention is applicable to many other uses than to measure and drain oil in a gas engine crank case.

I claim:

1. An engine having a crankcase, a drain-plug threaded in the crankcase, a tubular sleeve secured to said plug, and an oil gage in the sleeve, the sleeve and gage having interengaging portions of non-circular cross-section, so that the gage may be used when in the sleeve to unscrew the plug.

2. An engine having a crankcase, a device operable from inside the crankcase for draining the crankcase, an oil gage extending into the crankcase, and a connection from the oil gage to the said device for operating said device to drain the crank case.

3. A receptacle, a drain plug therefor, a sleeve secured to the drain plug and within the receptacle and operable to remove it, a member removably mounted in the sleeve and operable when in the sleeve to operate the sleeve to remove the plug.

4. A receptacle having a drain opening, a closure therefor, a gauge extending into a receptacle, said gauge having a handle, means connected to the closure and operated by a handle of the gauge to open and close the closure.

5. A receptacle, a device operable from inside the receptacle for draining the receptacle, a sleeve in the receptacle operably connected to said device, a measuring rod mounted in the sleeve and arranged to move the sleeve to operate the device.

6. An engine having a crank case, a device for draining the crank case, an oil gauge in the crank case, means operably connected to the oil gauge and the device whereby the device may be operated to drain the crank case by manipulation of the gauge.

7. A receptacle having a drain opening, a closure therefor, a sleeve member secured to the closure and open to the receptacle, a measuring gage movably mounted in the sleeve member, the sleeve and gage being shaped to prevent relative rotation whereby rotation of the gauge will effect rotation of the sleeve and closure.

8. An engine having a crankcase, a device operable from inside the crank case for draining the crank case, a sleeve in the crank case operatively connected to said device, and an oil gage rod removably mounted in the sleeve and arranged to move the sleeve to operate said device.

9. An engine having a crankcase, a drain-plug screwed into the bottom of the crankcase from inside the crankcase, and a member projecting within the crank case connected to the drain-plug and operable from above the crankcase for unscrewing the plug.

10. A receptacle having a drain opening, a gauge for measuring the depth of fluid in said receptacle, means non-rotatably associated with said gauge when the latter is in position in the receptacle, said means including a closure device operable to open or close said drain opening by a rotary movement of said gauge when the latter is in the receptacle.

11. A receptacle having a drain opening, a member operable from inside the receptacle for opening and closing the opening, a gauge extending into the receptacle, the member having a part above the closure non-rotatable relative to the gauge when the latter is inserted within the receptacle, whereby the depth of the fluid may be determined by the insertion and removal of the gauge and whereby the closure may be operated by a rotary movement of the gauge.

In testimony whereof I affix my signature.

PAUL B. TAYLOR.